US008440005B2

(12) United States Patent
Lang et al.

(10) Patent No.: US 8,440,005 B2
(45) Date of Patent: May 14, 2013

(54) ACTIVE CARBON FILTER FOR AN INTERNAL COMBUSTION ENGINE

(75) Inventors: Tobias Lang, Herzberg (DE); Heiko Freter, Einbeck (DE); Detlef Wolf, Einbeck (DE)

(73) Assignee: A. Kayser Automotive Systems GmbH (DE)

( * ) Notice: Subject to any disclaimer, the term of this patent is extended or adjusted under 35 U.S.C. 154(b) by 268 days.

(21) Appl. No.: 12/777,464

(22) Filed: May 11, 2010

(65) Prior Publication Data

US 2010/0313763 A1 Dec. 16, 2010

(30) Foreign Application Priority Data

May 11, 2009 (DE) ........................ 10 2009 020 703

(51) Int. Cl.
*F02M 25/08* (2006.01)
*B01D 53/04* (2006.01)

(52) U.S. Cl.
USPC ................................. 96/126; 96/130; 96/143

(58) Field of Classification Search .................... 95/146; 96/121, 126, 130, 131, 134, 143, 146, 152; 123/519
See application file for complete search history.

(56) References Cited

U.S. PATENT DOCUMENTS 4,598,686 A * 7/1986 Lupoli et al. .................. 123/519
4,721,846 A * 1/1988 Lupoli et al. .................. 219/206
5,861,050 A * 1/1999 Pittel et al. ...................... 95/115
6,230,693 B1 * 5/2001 Meiller et al. ................ 123/519
6,689,196 B2 * 2/2004 Amano et al. .................. 96/112
6,769,415 B2 * 8/2004 Reddy et al. .................. 123/519
7,059,306 B2 * 6/2006 Reddy ........................... 123/518
7,488,376 B2 * 2/2009 Kim et al. ....................... 96/134
7,922,797 B2 * 4/2011 Kosugi et al. ................... 96/147
2004/0094132 A1 5/2004 Fujimoto et al.
2006/0174857 A1 8/2006 Potier et al.
2011/0139129 A1 * 6/2011 Lang et al. .................... 123/519

FOREIGN PATENT DOCUMENTS

DE 10295967 4/2004

* cited by examiner

*Primary Examiner* — Frank Lawrence, Jr.
(74) *Attorney, Agent, or Firm* — Fox Rothschild LLP

(57) ABSTRACT

An active carbon filter intended for the fuel supply system of the internal combustion engine of a vehicle consists of a housing (1), inside of which flow paths for the different operating states of the filter are established between the ports (10, 11, 12) for connection with the top space of a tank, the ambient atmosphere and the intake manifold of the internal combustion engine. Proceeding from the port (11), these flow paths are characterized by chambers situated one in back of the other for pre-warming the air, an adjacent chamber (22) equipped with a first heating unit, an adjacent chamber (23) that accommodates active carbon particles, and another, adjacent chamber (28) that accommodates active carbon particles, is equipped with a second heating unit (34), and is provided with the ports (10, 12). This yields the establishment of optimal, in particular thermal conditions for the regeneration of the active carbon particles.

16 Claims, 9 Drawing Sheets

ACTIVE CARBON FILTER FOR AN INTERNAL COMBUSTION ENGINE

BACKGROUND OF THE INVENTION

This application claims foreign priority to German Patent Application 10 2009 020 703.1, filed May 11, 2009, which is hereby incorporated by reference herein.

The invention relates to an active carbon filter intended for the fuel supply system of the internal combustion engine of a vehicle and consists of a housing with ports for connection with the top space of a tank, for connection with the ambient atmosphere, and for connection with an intake manifold of the internal combustion engine, wherein the inside of the housing accommodates flow paths for the different operating states of the active carbon filter between these ports, and wherein at least one chamber containing a filler comprised of active carbon is arranged along the progression of these flow paths.

When using a hybrid drive characterized by an internal combustion engine and an electric engine for a motor vehicle, the time for which the internal combustion engine is in operation is reduced by the time for which the electric engine is in operation. Among other things, this fact is also important for an active carbon filter connected with a fuel tank that supplies the internal combustion engine, since its regeneration is limited to the times for which the internal combustion engine is in operation.

The fuel tank is usually in contact with the ambient atmosphere by way of a line, which prevents both a pressure buildup and a partial vacuum in the top space of the tank, which can arise during refueling, the removal of fuel, or an evaporation of fuel due to temperature conditions. An active carbon filter conventionally placed in this line is intended to prevent hydrocarbons from being uncontrollably released into the environment in this way.

Such an active carbon filter globally consists of an apparatus designed to accommodate active carbon particles, with ports for establishing a connection with the fuel tank, ambient atmosphere, and intake manifold of the internal combustion engine.

In order to reduce the amount of active carbon to be used, the port connected with the mentioned intake manifold routes ambient air through the active carbon filling of the filter during the scavenging phase, which takes up hydrocarbons adsorptively bound through desorption and introduces the latter into the combustion chamber of the engine, so that the active carbon is regenerated as a result. However, this process presupposes that the internal combustion is in operation. Since the amount of hydrocarbons exiting the top space due to evaporation and to be absorbed in the active carbon filling is independent of the operating time of the vehicle, the regeneration process must be concluded in a shorter time in a hybrid drive.

It is generally known that the conditions for regeneration in terms of acceleration can be improved via the thermal conditions of this conversion by heating the air used for regeneration and/or the active carbon.

Known from Document DE 102 95 967 T5 is an active carbon filter of this type in which the active carbon filling can be heated. In this case, use is made of plate-shaped or tubular, electrically operated heating elements with PTC characteristics that project into the active carbon filling from below, thereby setting up a temperature limit in an easy manner.

Known from Document US 2006/0174857 A1 is an apparatus for heating the air intended for regenerating an active carbon filter, which consists of component that is equipped with several channels running parallel to each other and carrying the air to be heated and made out of an active, heat-insulating material, wherein the air is heated by electrical resistor elements that extend inside the channels in their longitudinal direction.

Within the framework of the specific structural configuration, these known techniques for pre-warming the air used to regenerate the active carbon filling of such a filter under certain conditions have only a limited suitability for setting up a regeneration process that is sufficiently quick even for a hybrid drive, given the inadequate heat transfer.

Known at the company of the applicant for heating the air for regeneration purposes is to use an electrical conductor made of carbon, around which the air to be heated streams. Comparable hereto is a monolithic molding made of an active material that absorbs hydrocarbons, which is provided with boreholes extending in its longitudinal direction, and is simultaneously used as an electrical conductor to heat the air streaming through it.

The problem with regard to the two aforementioned technical solutions is the requirement for an exact and especially reliable temperature controller, since it is necessary that the ignition temperature of the hydrocarbons not be reached, and in particular that any sparking be prevented.

SUMMARY OF THE INVENTION

The object of the invention is to improve an active carbon filter of the kind mentioned at the outset with respect to the conditions of the regeneration process while preventing the disadvantages inherent in the prior art introduced at the outset. This improvement is to relate in particular, but not exclusively, to the suitability for use in hybrid drives. The object is achieved in such an active carbon filter as described herein.

Based on the above, it is essential with respect to the invention that the ambient air streaming into the active carbon filter be subjected to heating immediately, meaning already before entering the mentioned filling comprised of active carbon. As a result, the filling can be regenerated under conditions that are implemented by a rapid temperature control within the framework of the desired rate of desorption of the hydrocarbons adsorptively bound in the filling. This makes an active carbon filter conceived in this way especially suitable for use in hybrid drives, among other applications.

According to an aspect of at least one embodiment of the invention, the chamber containing a filling comprised of active carbon is additionally equipped with an electrically operable heater.

Aspects of at least one embodiment of the invention are geared toward a configuration of the path taken by the flowing air in conjunction with the port connected with the ambient atmosphere. Based on the above, this flow path is characterized by at least two chambers situated one in back of the other in the throughput direction, which are set up to pre-warm the entering air before the latter is exposed to a heating unit. These chambers carrying the flowing, heated air are also thermally connected with the chamber containing a filling comprised of active carbon, so that optimal conditions can be established for regenerating the active carbon or any other adsorptively active substances, in particular by heating the filling even without the necessity of a heating unit projecting directly into this filling, in that the air streaming into the active carbon filter is effectively heated, specifically using at least one heating unit arranged within the housing of the active carbon filter.

According to an aspect of at least one embodiment of the invention, a monolithic absorption unit intended to carry a flow is placed downstream from the chamber set up with a heating unit intended for heating the air in the direction of the inflowing atmospheric air. This absorption unit consists of a material that is absorptively active for hydrocarbons, and enhances the absorptive effect of the fillings that are present as a bulk material consisting of active carbon particles, accommodated in special chambers, and intended for carrying a flow. Because this adsorption unit is allocated almost directly to the atmospheric port of the housing, residual hydrocarbons that were not absorbed in the upstream filling are held back in a particularly reliable manner. Since this absorption unit can be oppositely subjected to heating, i.e., viewed in the direction of air flowing into the housing prior to entry into the absorption chamber, especially favorable preconditions for desorption are already established at this juncture during a rinsing operation of the active carbon filter.

Aspects of at least one embodiment of the invention are geared toward a more precise configuration of the used heating units. The critical aspect is that an electrical heating element is connected in a thermally conductive manner with a system of metallic, and hence highly heat conductive, wall elements, wherein the wall elements are configures and arranged to establish contact over a large area with either the air flowing through the heating unit or the active carbon particles present at the latter. Because the electrical heating element is designed as PTC thermistor or PTC element (positive temperature coefficient), it becomes especially easy to produce a temperature limitation that at least prevents the ignition temperature of the hydrocarbons from being reached.

Aspects of at least one embodiment of the invention are targeted at a more precise configuration of the heating unit intended for heating the air. Based on the above, the latter consists of a hollow structure, for example a tubular cylinder, which is used in the same way as the wall element rigidly connected thereto for purposes of heat transfer.

Aspects of at least one embodiment of the invention are geared toward the configuration of the chambers for the air entering the housing, which are situated upstream from the at least one heating unit, and can be used for pre-heating the air. The crucial aspect has to do with the fact that the flowing path traversing both chambers is characterized by a reversal of direction, so that the space inside the housing is utilized in an especially effective way, and heat transfer surfaces adequate in particular for purposes of pre-warming can be made available.

Aspects of at least one embodiment of the invention are geared toward the at least one heating unit intended for heating the filler comprised of active carbon. This is characterized by numerous wall elements that each form heat transfer surfaces, and in their entirety comprise a structure preferably shaped like a star in cross section.

Aspects of at least one embodiment of the invention are geared toward additional configurations of the absorption unit, as well as of the chambers intended for accommodating active carbon particles.

An aspect of at least one embodiment of the invention relates to the electrical configuration of the used heating units. It is here especially advantageous that the wall elements of several heating units be actively connected with only a single heating element. As a result, this heating element acts as a heat source, the heat from which is relayed due to the thermal conduction properties of the interconnected wall elements of several heating units.

According to an aspect of at least one embodiment of the invention, the heating units are connected with a controller in order to activate the heating unit as a function of the operating state of the active carbon filter as well as the vehicle, in particular the current absorption capacity. This controller, which can be connected with a hydrocarbon sensor that acquires the current absorption capacity, can be set up in such a way that the heating units are already activated prior to a regeneration process.

Let it be noted at this juncture that the active carbon particles used for absorption can also be replaced by any other adsorptively active particles known and suitable to the expert for this purpose.

The chambers containing the active carbon particles, in particular their inlet and outlet openings, are occupied by a filter layer according to the features in claim 18, e.g., a mat.

BRIEF DESCRIPTION OF THE DRAWINGS

The invention will be explained in greater detail below drawing reference to the exemplary embodiments depicted in the attached drawings. Shown on.

DETAILED DESCRIPTION

Figure 1:
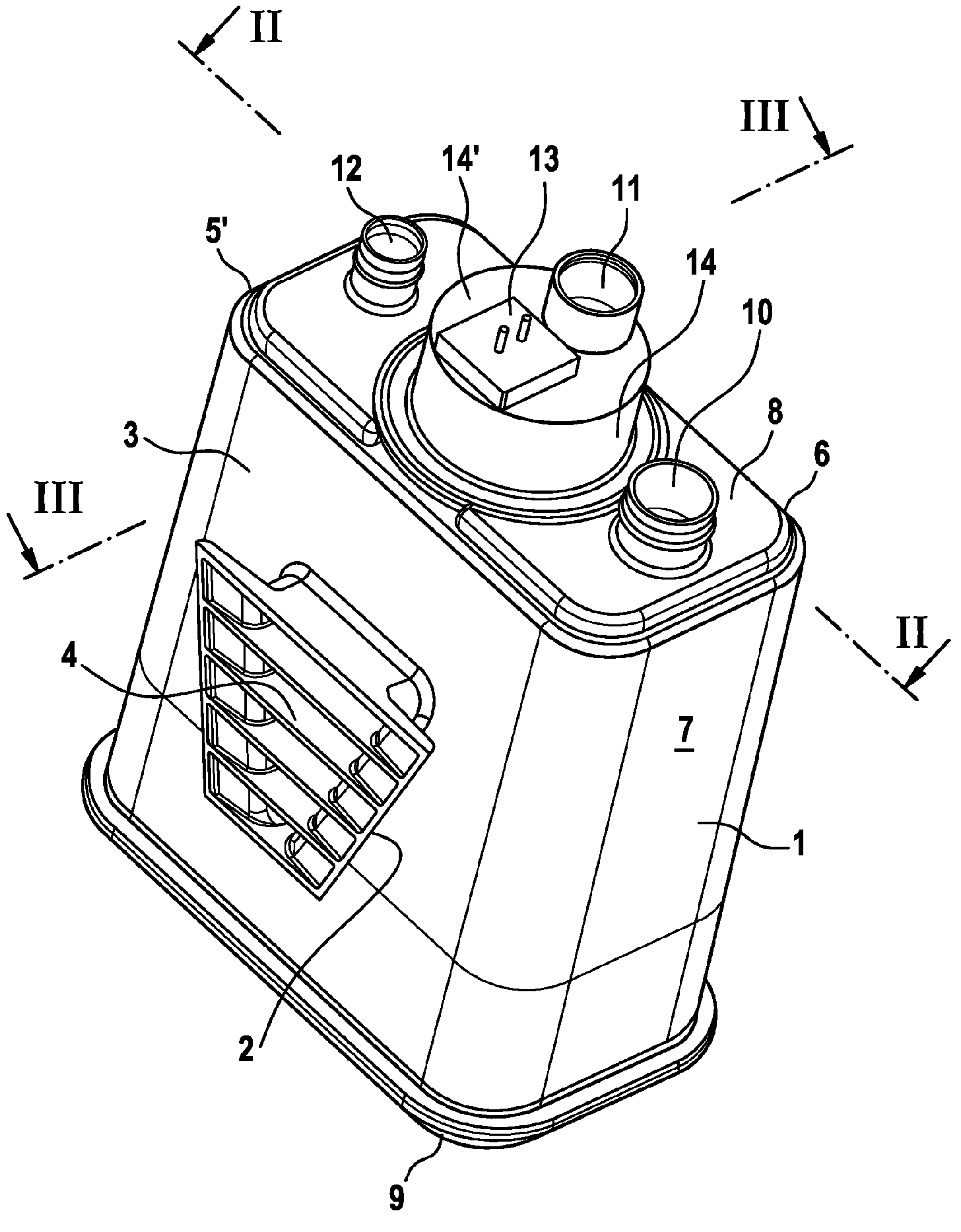
FIG. 1 is a perspective view of an active carbon filter according to the invention.

The housing of an active carbon filter with approximately a rectangular cross section marked 1 on FIG. 1 is provided at location 2 on its vertical wall 3 with a mounting device 4 intended for fixation in a vehicle, which is not described in any greater detail below.

The rest of housing 1 consists of the vertical walls 5, 6 and 7, a floor section 8 and a cover 9, which is detachably connected with the facing edges of walls 5 to 7. The floor section 8 is connected with a port 10 intended for connection to a tank, a port 11 intended for connection to the ambient atmosphere, and a port 12 intended for connection with the intake manifold of an internal combustion engine. Finally, an electrical port is marked 13, and just as port 11, is arranged in the front side of a cylindrical housing section 14 that protrudes from the plane of the floor section 8. The ports 10 to 12 are each depicted by tubular supports, which are set up for attaching line elements (not graphically depicted), while the electrical port is shown by example as a plug-and-socket connection.

Functional elements that correspond with those on FIG. 1 are numbered appropriately on FIG. 2 to 9, thus eliminating any need for repeated descriptions in this respect.

Figure 2:
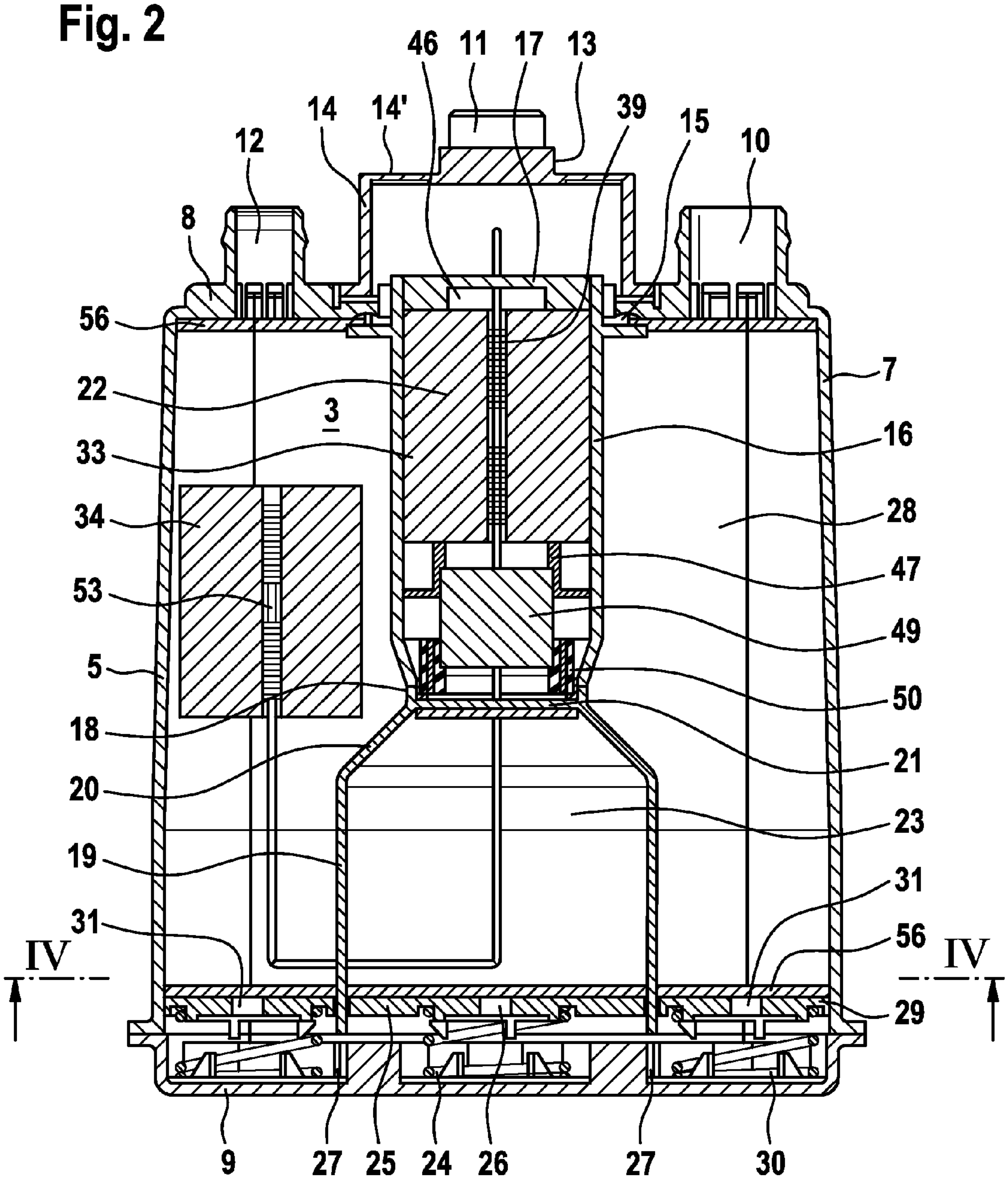
FIG. 2 is a depiction of the active carbon filter according to cutting plane II-II on FIG. 1.
Figure 3:
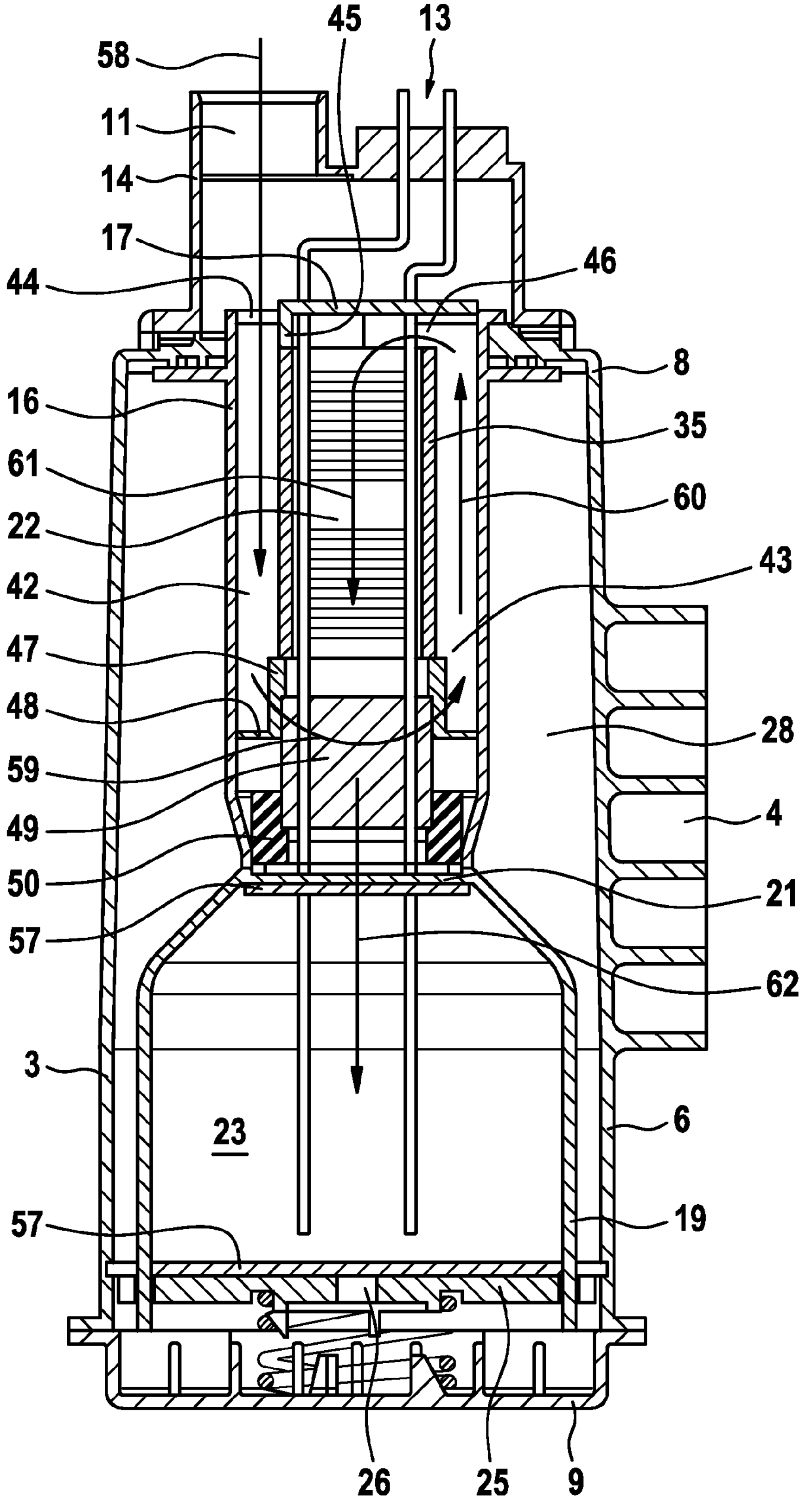
FIG. 3 is a depiction of the active carbon filter according to a cutting plane III-III on FIG. 1.
Figure 4:
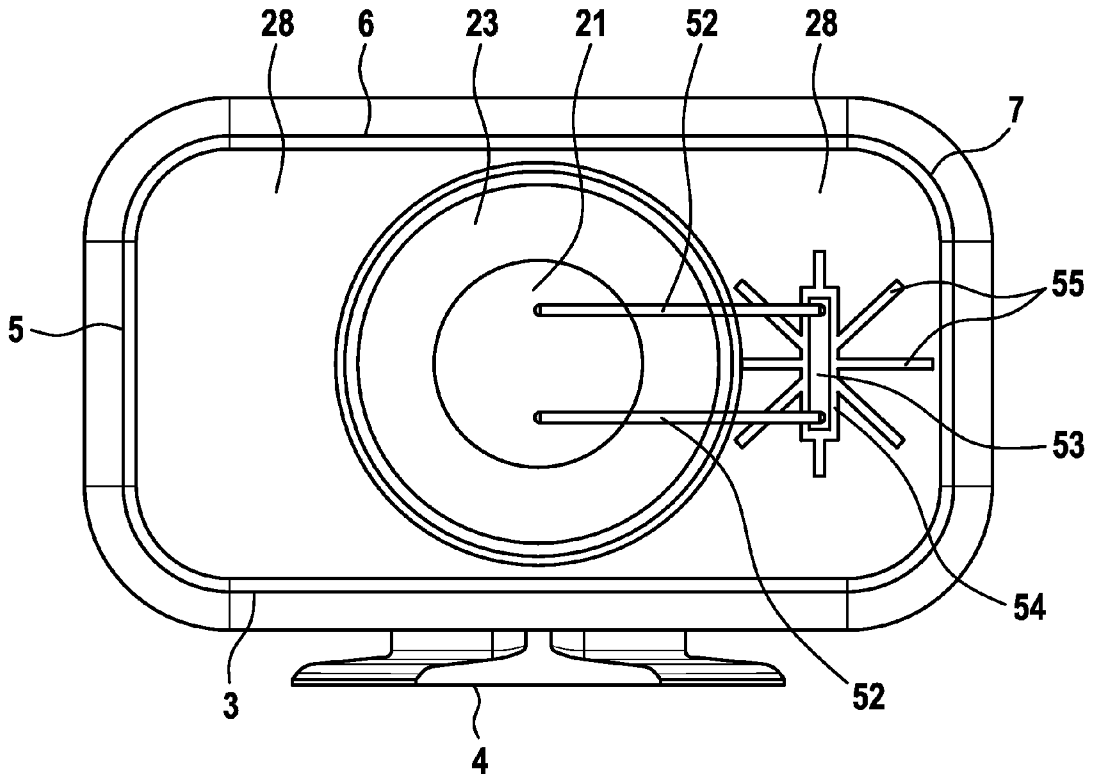
FIG. 4 is a bottom view of the active carbon filter in a cutting plane IV-IV on FIG. 1.

As evident based on FIGS. 2 and 3, the housing section 14 externally covers a circular recess 15 in the floor section 8, in which a cylindrical tubular element 16 is inserted within the housing 1, extending coaxially to the housing section 14, and secured therein in a manner not shown. A deflection cover 17 to be described in greater detail below that extends approximately in the plane of the recess 15 closes the tubular element 16 in its front side facing the housing section 14.

The end of the tubular element 16 facing away from the housing section 14 is connected by a constriction 18 with an also cylindrical tubular element 19 with a large diameter that extends coaxially to the housing section 14, wherein a conical transition section 20 is arranged between the tubular elements 16, 17. The end of the tubular element 19 facing away from the housing section 14 is supported on the cover 9.

The interior space of the insert comprised of the tubular elements 16, 19 along with the transition section 20 is divided by an intermediate floor 21 into a chamber 22 essentially formed by the tubular element 16 and a chamber 23 essentially formed by the transition section 20 and the tubular element 19, which are interconnected by openings (not graphically depicted) in the intermediate floor 21.

The end of the chamber 23 facing the cover 9 is formed by a pressure plate 25 that is adjusted to its cross section and resiliently supported against the cover by a pressure spring 24, and is to be provided with at least one central opening 26. Openings 27 are also situated in the wall section of the tubular element 19 that extends between the cover 9 and pressure plate 25, and whose function will be explained below.

The chamber 28 definable by the interior side of the housing 1 on the one hand and the exterior side of the insert described above on the other is bordered on its end facing away from the housing section 14 by pressure plates 29, which are supported against the interior side of the cover 9 in the same way as the pressure plate 25 via pressure springs 30. Each of the pressure plates 29 is characterized by at least one opening 31, which establishes a connection between the chamber 28 and the space between the cover 9 and the pressure plate 27.

As evident, the chambers 23, 28 are continuously interconnected via the openings 26, 27, 31.

Figure 5:
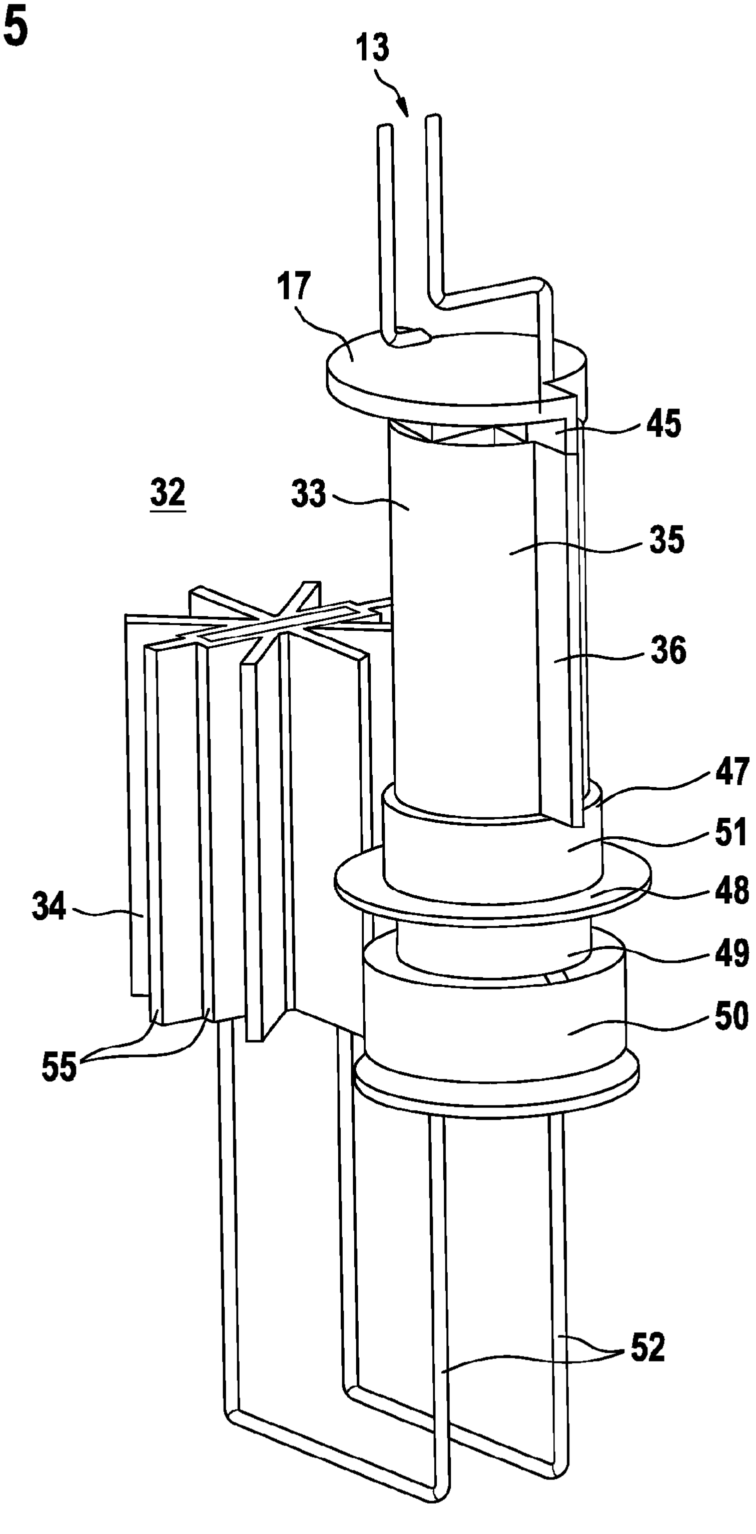
FIG. 5 is an isolated, perspective overall view of a first exemplary embodiment of a heater used in the active carbon filter.
Figure 7:
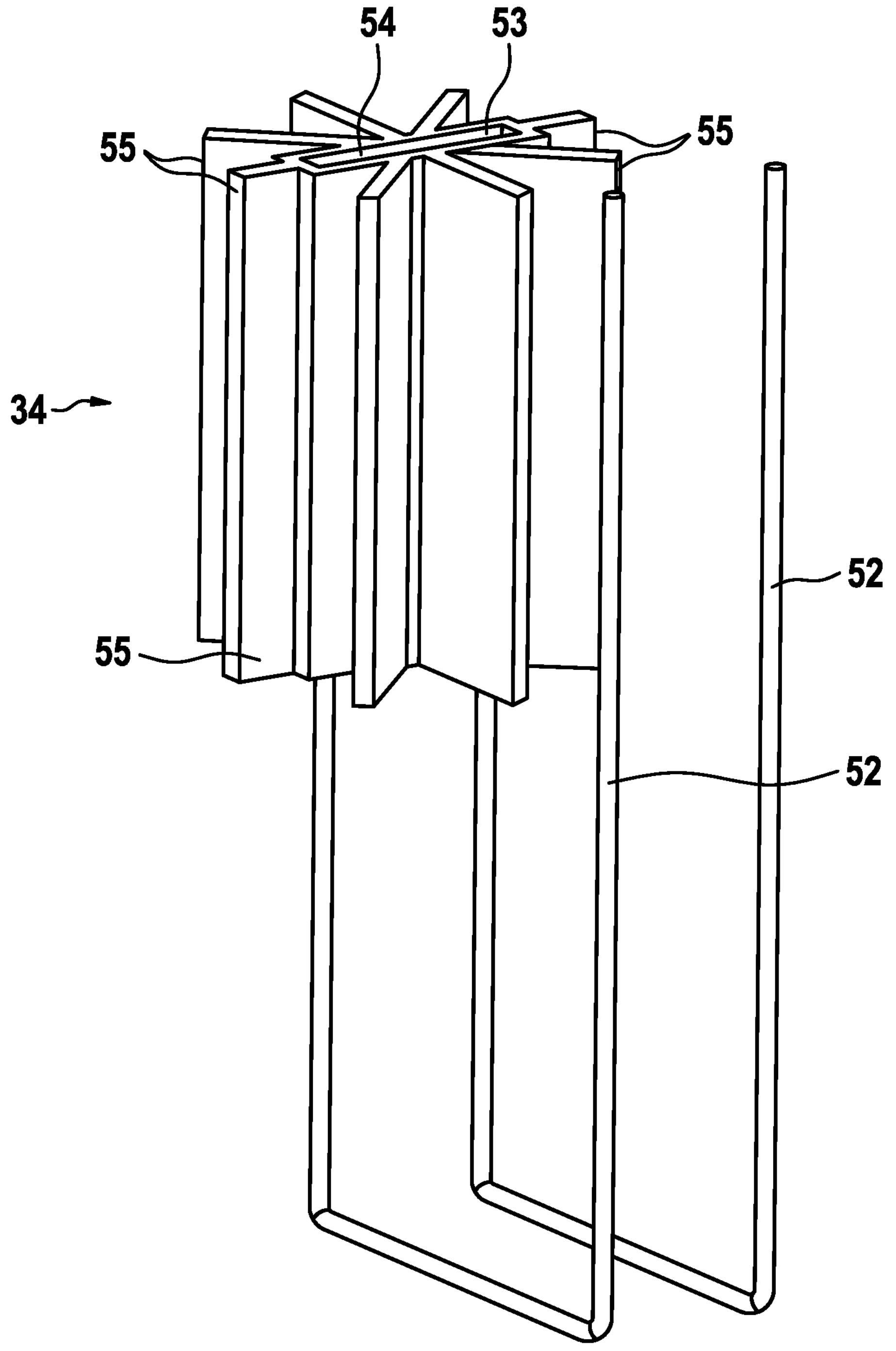
FIG. 7 is an isolated, perspective view of a second section of the heater shown on FIG. 5.

Situated within the chambers 22, 28 is a heating device 32 depicted in isolation on FIGS. 5 and 7, which consists of a first 33 heating unit inserted in chamber 22 and a second heating unit 34 inserted in chamber 28.

Figure 6:
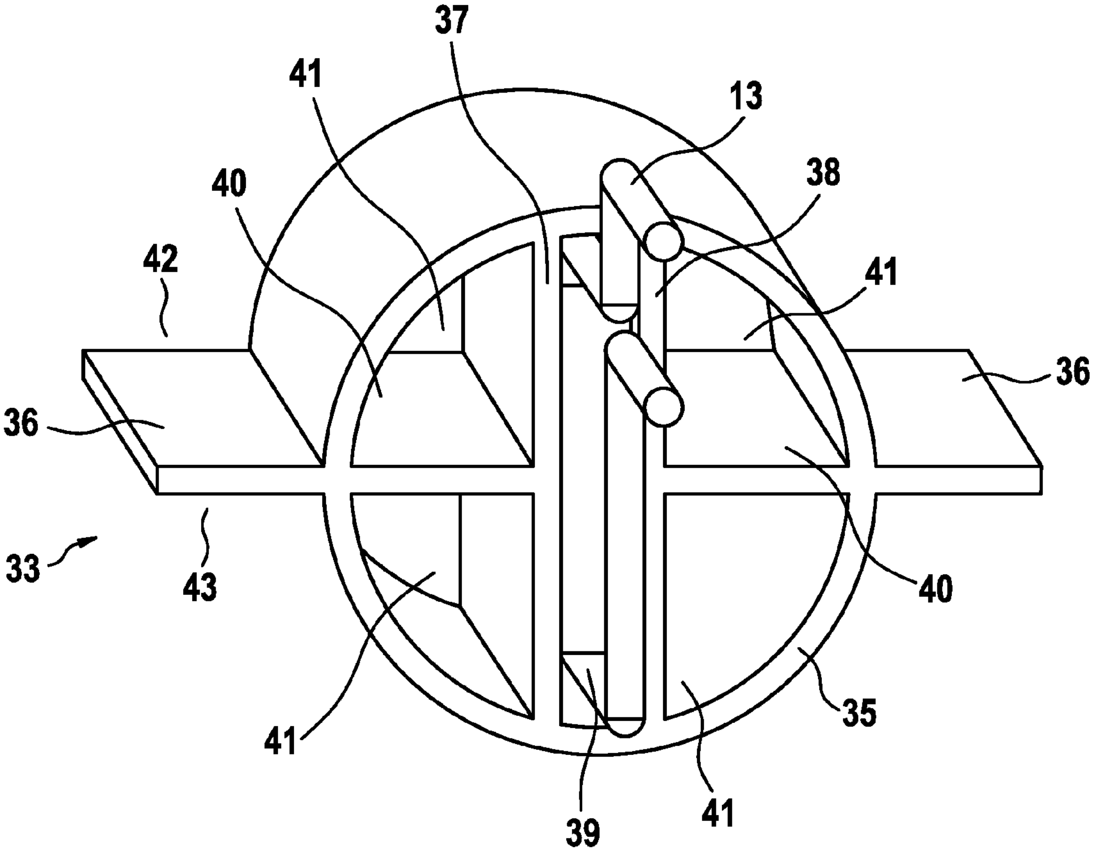
FIG. 6 is an isolated, perspective view of a first section of the heater shown on FIG. 5.

The heating unit 33 shown on FIG. 6 consists of a metal tubular cylinder 35, the exterior side of which has secured to it diametrically opposed, equally dimensioned, flat wall elements 36. The interior space of this tubular cylinder 35 is characterized by two parallel wall elements 37, 38, the intermediate space between which accommodates an electrical heating element 39. Extending perpendicular to the wall elements 37, 38 and flush with the wall elements 36 mentioned at the outset are two additional, equally dimensioned wall elements 40, which divide the mentioned interior space into four equally dimensioned chambers 41 broken up into circular sectors in cross section.

As evident from a combined examination of FIGS. 2, 3 and 6, the interior space of the tubular element 16 is divided by the wall elements 36 into two chambers 42, 43 shaped like half-rings in cross section with the heating device 32 built in.

As evident from FIG. 3, 5, the deflection cover 17 is semicircular in design, and on the end of the tubular element 16 facing the housing section 14 forms an opening 44 for the chamber 42 and a closed wall for the chamber 43. In particular, the deflection cover 17 is provided with connecting wall elements 45, which attach to the wall elements 36 of the heating unit 33, and separate the chambers 42, 43 from each other at this location.

As a result of the connecting wall elements 45, which abut the facing front side of the tubular cylinder 35, an opening 46 is set up between this front side and the facing bottom side of the deflection cover 17, which establishes a connection between the chambers 42, 43.

The front side of a deflection ring marked 47 supports the end of the heating unit 33 facing away from the housing section 14. Molded onto this deflection ring 47 comprised of a tubular element 51 is a ring flange 48, which forms the lower termination of the chambers 42, 43, meaning the one that lies opposite the deflection cover 17. After the wall elements 36 end at a distance above the ring flange 48, the chambers 42, 43 are interconnected at this location. The ring flange 48 is also designed in such a way as to establish a bottom termination for the chambers 42, 43.

An absorption unit marked 49 is supported against the intermediate floor 21 via a sealing ring 50. The monolithic absorption unit 49 is also fixed within the tubular element 51, and intended to carry a stream of air. The function of the absorption unit will be explained in the following.

Line elements marked 52 start from the heating unit 33 and extend through the chamber 23 until into the chamber 28, and are here connected with the second heating unit 34. The heating unit 34 consists of a centrally arranged, slotted receptacle 54 for an electrical heating element 53, wherein radially uniformly distributed, star-shaped wall elements 55 are molded onto the walls of the receptacle.

Within the housing 1, the chamber 28 bordered on the inside by the tubular element 16, transition section 20 and tubular element 19 is filled with active carbon particles, wherein a mat 56 is provided as the filter layer in front of the outlet opening of the ports 10, 12 as well as overlapping the openings 31 of the pressure plates 29.

In like manner, the chamber 23 is filled with active carbon particles, wherein the outlet openings in the intermediate floor 21 and the openings 26 of the pressure plate 25 are overlapped by a mat 57 as the filter layer.

The heating unit 34 is held within the chamber 28 adjacent to the port 4 in a manner not graphically depicted in any greater detail, so that the wall elements 55 are integrated into the filling comprised of active carbon particles, imparting an intensive heat exchange with the latter.

When installed, the active carbon filter is incorporated via its ports 10 to 12 into a line system, which connects it with the intake manifold of the internal combustion engine, the top space of a tank and the ambient atmosphere, wherein the respective lines integrate valves with a position adjusted to the operating phase of the active carbon filter. In addition to equalizing pressure within the tank taking into account varying fill levels, temperature fluctuations, and evaporations, the key here is to at least limit the escape of hydrocarbon shares for reasons of environmental protection. These hydrocarbon shares are to be retained with the engine idling through adsorption in the filter, and routed to the combustion chamber of the engine together with the combustion air within the framework of a purging operation as a result of desorption.

In the following, the path taken by the air starting from the ambient atmosphere, passing thorough the active carbon filter, and ending at the port 12 with the engine running will be described, drawing reference to FIG. 1, 3.

During exposure to the vacuum present in the intake manifold of the engine and conveyed to the port 12, ambient air is aspirated via the port 11 in the direction of the arrow 58, and enters into the chamber 42 via the housing section 14 and opening 44. A deflection takes place at the deflection ring 47, the ring flange 48 of which seals this chamber on its side facing away form the housing section 14, in the direction of arrow 59 toward the chamber 43, wherein an additional deflection point is set up in the chamber 22 after the stream has passed through this chamber 43 in the direction of arrow 60 on the deflection cover 17 that covers this chamber on its end facing the housing section 14 via the opening 46 according to arrow 61. Inside the chamber 22, the air flows through the heating units 33 placed therein, in particular its chambers 41, to subsequently pass into the chamber 23 via the absorption units 49 and openings in the intermediate floor 21 according to arrow 62. The air exits the chamber 23, and passes through its opening 26 in the floor and the openings 31 also situated in the floor, into the chamber 28 and to the port 12.

Because the air is guided on the inlet side through the absorption unit 49 and the active carbon fillings of the chambers 23, 28, the hydrocarbon shares introduced into the combustion chamber of the engine together with the air and retained therein undergo desorption.

The heating unit 34 mentioned at the outset heats the active carbon filling in the chamber 28. The heating unit 33 also mentioned at the outset heats the air directly, so that the air entering the chambers 42, 43 is pre-heated, in particular as the result of contacting the tubular element 16 and tubular cylinder 35.

This makes it possible to effectively counter a cooling of the active carbon particles triggered by desorption, so that optimal thermal conditions can be established for regenerating the active carbon and absorption unit 49, despite the fact that combustion engine operation is diminished by a hybrid engine, for example.

Figure 8:
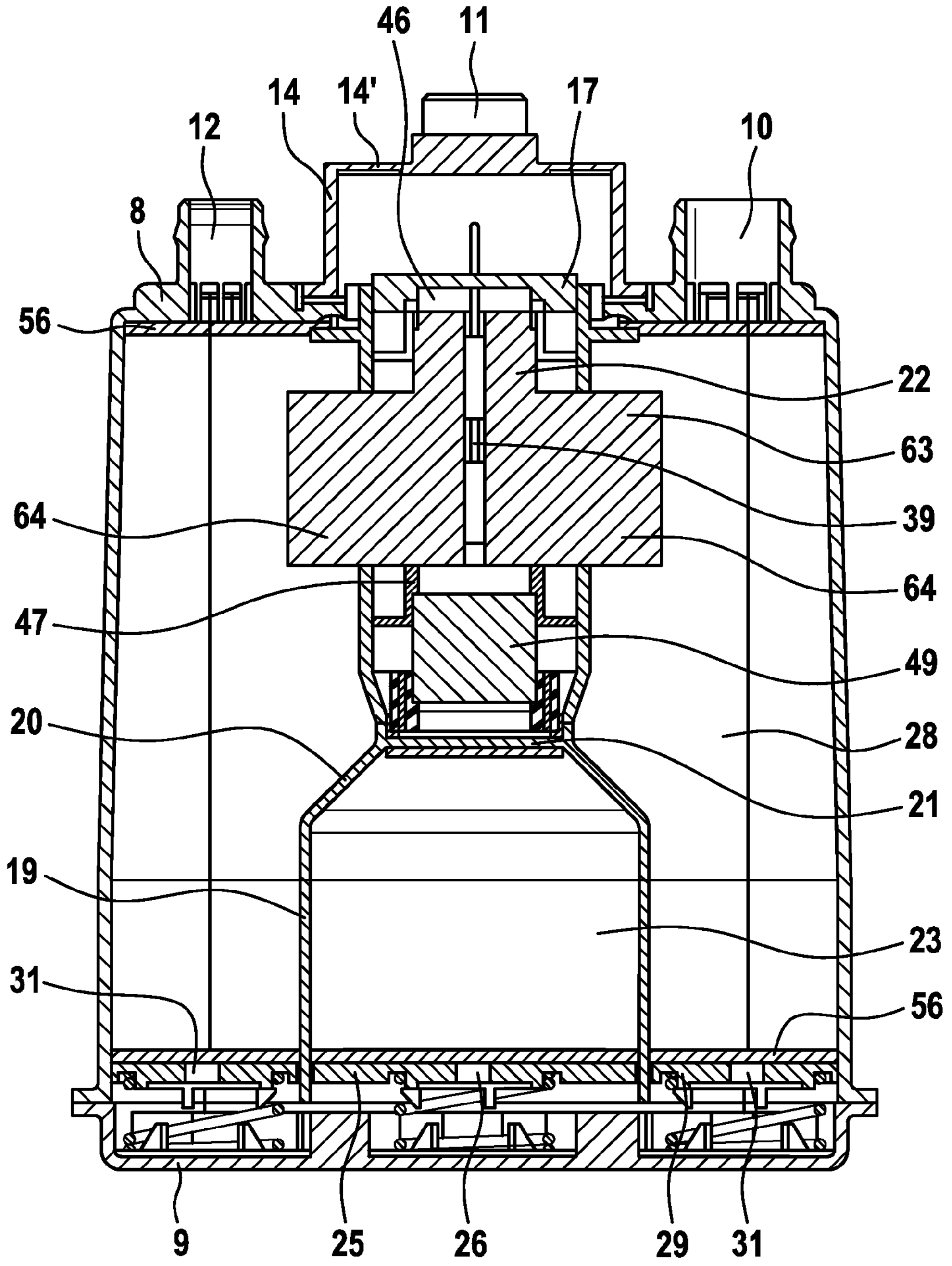
FIG. 8 is a second exemplary embodiment of a heater used in the active carbon filter, viewed in a vertical cutting plane of the latter.

The second exemplary embodiment of an active carbon filter shown on FIG. 8 differs from the one on FIG. 1 to 7 only in that a uniform heating device 63 is used here, depicted in isolation on FIG. 8, which exerts a heating effect both inside the chamber 28 and inside the chamber 22.

Figure 9:
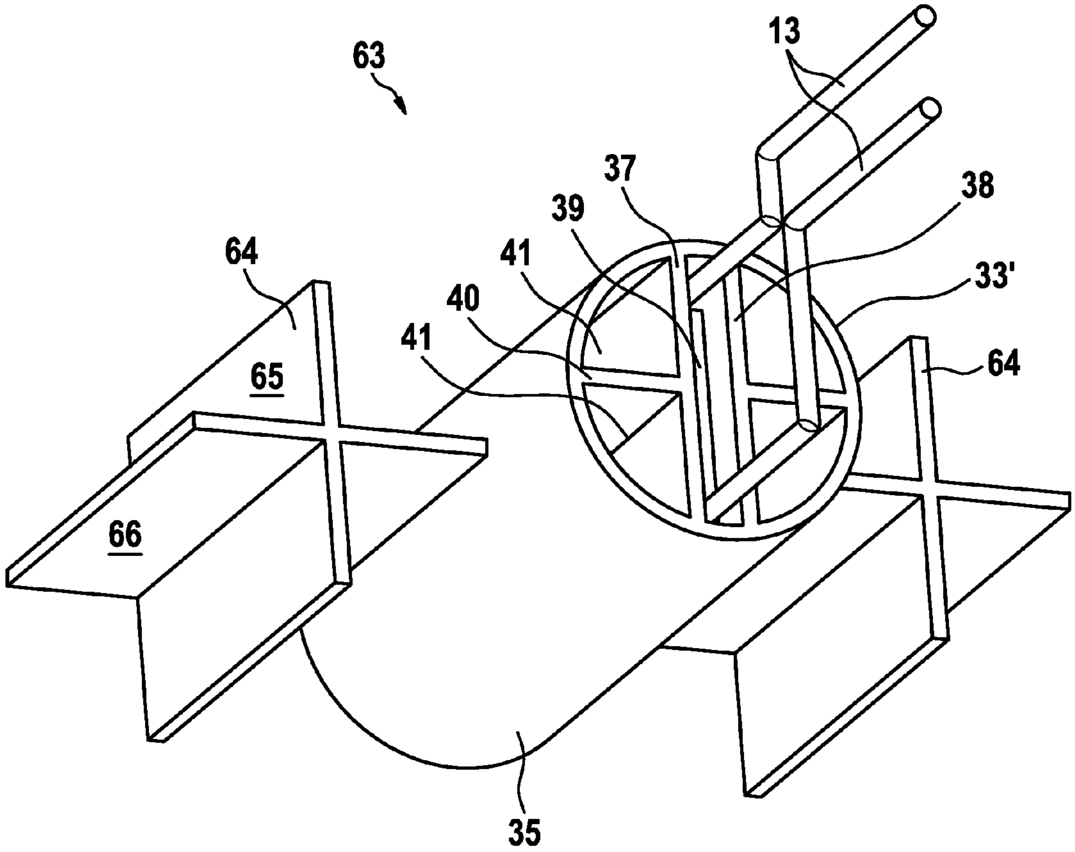
FIG. 9 is an isolated, perspective view of the heater according to FIG. 8.

As evident from FIG. 9, the heating device 63 consists of a centrally located heating unit 33' that structurally corresponds to the heating unit 33, whose tubular cylinder 35 accommodates two diametrically opposed, equally dimensioned heating units 64 on the outside and peripherally. Each heating unit 64 consists of two equally dimensioned wall elements 65, 66 that extend perpendicularly to each other, one of which is rigidly connected with the tubular cylinder 35.

The entire structure of the heating unit 63 comprised of the heating units 33', 64 consists of a metal, so that the heat generated via thermal conduction via the electrical heating element 39 is conveyed over the wall elements 37, 38, 40 and 65, 66 to the air streaming through the chambers 41 as well as to the active carbon particles, into which the wall elements 65, 66 are embedded in the installed state.

As evident from FIG. 8, the heating units 64 extend within the chamber 28 and therein perform the same function as the heating units 34 in the exemplary embodiment according to FIG. 1 to 7.

The used electrical heating elements 39, 53 are preferably designed as resistor elements with PTC characteristics, thereby setting up a simple and functionally reliable thermal cutout.

REFERENCE LIST

1. Housing
2. Location
3. Wall
4. Holding device
5. Wall
6. Wall
7. Wall
8. Floor section
9. Cover
10. Port
11. Port
12. Port
13. Electrical port
14. Housing section
15. Recess
16. Tubular element
17. Deflection cover
18. Constriction
19. Tubular element
20. Transition section
21. Intermediate floor
22. Chamber
23. Chamber
24. Pressure spring
25. Pressure plate
26. Opening
27. Opening
28. Chamber
29. Pressure plate
30. Pressure spring
31. Opening
32. Heating device
33. Heating unit
33". Heating unit
34. Heating unit
35. Tubular cylinder
36. Wall element
37. Wall element
38. Wall element
39. Heating element
40. Wall element
41. Chamber
42. Chamber
43. Chamber
44. Opening
45. Connecting wall element
46. Opening
47. Deflection ring
48. Ring flange
49. Absorption unit
50. Sealing ring
51. Tubular element
52. Line elements
53. Heating element
54. Receptacle
55. Wall element
56. Mat
57. Mat
58. Arrow
59. Arrow
60. Arrow
61. Arrow
62. Arrow
63. Heating device
64. Wall element
65. Wall element

The invention claimed is:

1. An active carbon filter intended for the fuel supply system of the internal combustion engine of a vehicle consists of a housing with a first port for connection with the top space of a tank, a second port for connection with the ambient atmosphere, and a third port for connection with an intake manifold of the internal combustion engine, wherein the inside of the housing accommodates flow paths for the different operating states of the active carbon filter between the first, second and third ports, wherein at least one first chamber containing a filler comprised of active carbon is arranged along the progression of these flow paths, and a second chamber containing an electrically heatable heating unit which directly heats air passing through the second chamber is located in the section of the flow path adjacent to the second port and before the at least one first chamber containing a filler consisting of active carbon, wherein the heating unit includes metal wall elements of at least two heating units that initiate the transmission of heat to the air flowing through and/or the filler consisting of active carbon are thermally connected with a shared electrical heating element.

2. The active carbon filter according to claim 1, wherein the heating units are actively connected with a controller.

3. The active carbon filter according to claim 1, wherein the inlet and outlet openings of each at least one first chamber accommodating a filler consisting of active carbon are covered by a filter layer.

4. The active carbon filter according to claim 1, wherein the flow path between the second chamber containing the heating unit and the second port exhibits at least two sub-chambers that are situated in series in the throughput direction and exchange heat with at least the second chamber.

5. The active carbon filter according to claim 1, wherein the flow path between the second chamber containing the heating unit and the second port exhibits at least two sub-chambers that are situated in series in the throughput direction and exchange heat with at least the first chamber containing a filler consisting of active carbon.

6. The active carbon filter according to claim 1, wherein the second chamber containing the heating unit further contains a monolithically designed absorption unit that can carry a flow and is arranged downstream from the heating unit in the direction of the air flowing in via the second port.

7. The active carbon filter according to claim 1, wherein the heating element is a resistor element with PTC characteristics.

8. The active carbon filter according to claim 1, wherein the wall elements of the heating unit consists of a hollow structure, to which are secured the wall elements that form the heat transmission surfaces for the air flowing through.

9. The active carbon filter according to claim 8, wherein the hollow structure consists of a tubular cylinder, wherein the heating element is arranged inside the tubular cylinder, and wherein at least one portion of the wall elements forms chambers that can carry a flow inside the tubular cylinder.

10. The active carbon filter according to claim 1, wherein the wall elements of the heating unit consists of a large-surface structure shaped like a star in cross section that establishes thermally conductive contact with the filler consisting of active carbon.

11. The active carbon filter according to claim 1, wherein at least two first chambers arranged in series in the direction of flow containing a filler consisting of active carbon are provided within the housing, proceeding from the second port along the flow path.

12. The active carbon filter according to claim 6, wherein the absorption unit is equipped with mutually parallel throughput openings.

13. An active carbon filter intended for the fuel supply system of the internal combustion engine of a vehicle consists of a housing with a first port for connection with the top space of a tank, a second port for connection with the ambient atmosphere, and a third port for connection with an intake manifold of the internal combustion engine, wherein the inside of the housing accommodates flow paths for the different operating states of the active carbon filter between the first, second and third ports, wherein at least one first chamber containing a filler comprised of active carbon is arranged along the progression of these flow paths, and a second chamber containing an electrically heatable heating unit which directly heats air passing through the second chamber is located in the section of the flow path adjacent to the second port and before the at least one first chamber containing a filler consisting of active carbon, wherein the heating unit has at least one electrical heating element and a system of metal wall elements consisting of a hollow structure, to which are secured the wall elements that form the heat transmission surfaces for the air flowing through, which are in thermally conductive contact with the heating element, and form surfaces for conducting heat on the filling consisting of active carbon and/or the air flowing through, wherein the hollow structure consists of a tubular cylinder, wherein the heating element is arranged inside the tubular cylinder, and wherein at least one portion of the wall elements forms chambers that can carry a flow inside the tubular cylinder, and wherein the tubular cylinder forms the interior side of at least one chamber that envelops the latter and is intended to carry a flow.

14. The active carbon filter according to claim 13, wherein the at least one first chamber containing a filler of active carbon is equipped with an electrically operable heating unit.

15. The active carbon filter according to claim 14, wherein each heating unit is equipped with an electric heating element.

16. An active carbon filter intended for the fuel supply system of the internal combustion engine of a vehicle consists of a housing with a first port for connection with the top space of a tank, a second port for connection with the ambient atmosphere, and a third port for connection with an intake manifold of the internal combustion engine, wherein the inside of the housing accommodates flow paths for the different operating states of the active carbon filter between the first, second and third ports, wherein at least one first chamber containing a filler comprised of active carbon is arranged along the progression of these flow paths, and a second chamber containing an electrically heatable heating unit which directly heats air passing through the second chamber is located in the section of the flow path adjacent to the second port and before the at least one first chamber containing a filler consisting of active carbon, wherein the heating unit has at least one electrical heating element and a system of metal wall elements consisting of a hollow structure, to which are secured the wall elements that form the heat transmission surfaces for the air flowing through, which are in thermally conductive contact with the heating element, and form surfaces for conducting heat on the filling consisting of active carbon and/or the air flowing through, wherein the hollow structure consists of a tubular cylinder, wherein the heating element is arranged inside the tubular cylinder, and wherein at least one portion of the wall elements forms chambers that can carry a flow inside the tubular cylinder, and wherein the exterior side of the tubular cylinder has molded to it at least two wall elements that divide the intermediate space existing between the latter and an exterior tubular element into two chambers, and are arranged one in back of the other viewed in the throughput direction along the mentioned flow path, hereby setting up an opposite direction of flow on either side of the wall elements.

* * * * *